United States Patent
Yen

(10) Patent No.: US 7,104,846 B1
(45) Date of Patent: Sep. 12, 2006

(54) MULTIPLE-IN-ONE MEMORY CARD INSERTION SEAT

(75) Inventor: Ming Hui Yen, Taipei Hsien (TW)

(73) Assignee: Chant Sincere Co., Ltd., (TW)

( * ) Notice: Subject to any disclaimer, the term of this patent is extended or adjusted under 35 U.S.C. 154(b) by 0 days.

(21) Appl. No.: 11/242,835

(22) Filed: Oct. 5, 2005

(51) Int. Cl.
*H01R 24/00* (2006.01)

(52) U.S. Cl. .................................................. 439/630

(58) Field of Classification Search ............... 439/630
See application file for complete search history.

(56) References Cited

U.S. PATENT DOCUMENTS

| | | | |
|---|---|---|---|
| 6,612,492 B1 * | 9/2003 | Yen | 235/451 |
| 6,761,313 B1 * | 7/2004 | Hsieh et al. | 235/451 |
| 7,040,928 B1 * | 5/2006 | Lai et al. | 439/630 |

* cited by examiner

*Primary Examiner*—Briggitte R. Hammond
(74) *Attorney, Agent, or Firm*—Bacon & Thomas PLLC

(57) ABSTRACT

A multiple-in-one memory card insertion seat is used to improve the defects of the connection of an MS Duo memory card or an MS Pro Duo memory card and an adaptor card. A shift of the matched slot to a corresponding MS memory card is toward the first pin of the XD terminal group so that the GND pin of the XD memory card is unconnected. Besides, the grounding function of the iron casing is removed so as to avoid that the outer metal layer of the adaptor card is in contact with the first pin and the second pin of the XD memory card causing conductance at the same time due to mistake contacts and crash. Besides, the grounding function of SDIO memory card is not influenced by use of the iron casing arm passing through a contact detection sheet and resisting against the grounding terminal to discharge.

3 Claims, 7 Drawing Sheets

MULTIPLE-IN-ONE MEMORY CARD INSERTION SEAT

BACKGROUND OF THE INVENTION (a) Field of the Invention

The present invention relates to multiple-in-one memory card insertion seats, and particularly to a multiple-in-one memory card insertion seat used in the connection of an MS Duo memory card or an MS Pro Duo memory card and an adaptor card. The multiple-in-one memory card insertion seat is capable of avoiding to conduct due to mistake contacts or crashes because of the connection of an outer metal layer and pins so as to assure the grounding of a SDIO memory card.

(b) Description of the Prior Art

A prior memory card insertion seat has a multi-common slot to provide the function of inserting various memory cards (such as: MSs, MS Pros, SDs, MMCs, MMC4.0s and XD memory cards). Alternatively a memory card, such as an MS Duo, an MS Pro Duo, a miniSD, a microSD (T-flash), an MMC Micro, an RSMMC and an RSMMC4.0, uses a selected adaptor card to connect correspondingly, and then inserts into a common slot so as to achieve the common use of a multiple-in-one memory card insertion seat and satisfy demands of users.

A prior art multiple-in-one memory card insertion seat comprises an iron casing, an insulation common terminal seat and multi-conductive terminals capable of matching contacts with various memory cards (such as: an MS terminal group, a SD terminal group, an MMC4.0 terminal group and an XD terminal group etc.). The common terminal seat includes prior contact detection sheet, a read and write proof detecting sheet, a grounding terminal or a welding sheet. After the iron casing is connected to conductive terminals, a layer-shape and wide-interlinked multi-common slot is formed so as to provide the function for inserting various memory cards.

Referring to FIG. 9, FIG. 10 and FIG. 11, because the above-mentioned prior MS Duo (or MS Pro Duo) memory card 4 belongs to a short card style, the MS Duo (or MS Pro Duo) memory card 4 is often connected to an adaptor card 40 for simulating as a MS long card style so as to insert an insertion seat (e.g. a card reader) suitable for the MS long card. However, the matched adaptor card 40 has an outer metal layer 401 (the cross-section of the outer metal layer 401 is approximate U-shape) and none-metal layer 402. Although the outer metal layer 401 has been painted with an insulation layer, the insulation painting is scraped so as to expose out the outer metal layer 401 after being used for a long time. Thus, the outer metal layer 401 is easily in contact with the first pin 331 and the second pin 332 (e.g. GND and CD pin) of the conductive terminals of the XD memory card so as to conduct signals due to mistake contacts and be incapable of reading normal data. Besides, based on experience, when the outer metal layer 401 of the adaptor card 40 is in contact with the 19th pin and 20th pin (e.g. VCC pin) of the conductive terminals of the XD memory card and the first terminal pin (or the second pin) at the same time, the multiple-in-one memory card insertion seat is easy to crash.

Since the MS Duo, the MS Pro Duo short memory cards and the matched adaptor cards are known in the prior arts, the memory card insertion seat must be limited in the given memory cards to improve thereof and then modify the situation of conducting signals due to mistake contacts.

SUMMARY OF THE INVENTION

Accordingly, the primary object of the present invention is to provide a multiple-in-one memory card insertion seat. The multiple-in-one memory card insertion seat is aimed at improving the defects of installing of an MS Duo short memory card or a MS Pro Duo short memory card and an adapter card.

In order to achieve the object of the present invention, the MS memory card of the memory card insertion seat shifts to a selected direction about the distance ranges in 0.3~1.3 mm. Besides, the first pin of the XD memory card (e.g. GND pin) is not connected and the grounding function of an iron casing is removed (e.g. the iron casing is unconnected to the grounding point of a PCB). Therefore, even an outer metal layer of an adaptor card is exposed out, the adaptor card will not conduct due to mistake contacts with the first pin and the second pin of the XD memory card so as to assure of the memory card reading data normally and function well. Furthermore, the situation is prevented from the 19th pin and 20th pin (VCC pins) being conducted with the iron casing so as to crash thereof.

The second object of the present invention is to provide the multiple-in-one memory card insertion seat, wherein the grounding function of the iron casing is removed. Because the grounding function of iron casing 1 has been removed, the grounding function of the SDIO memory card 42 (e.g. an SD memory card with the input-output functions of Bluetooth or wireless network) must be avoided to impede. Furthermore, the SDIO memory card resists against and contacts the grounding terminal and iron casing arm. Therefore, the iron casing arm, contact detection sheet and grounding terminal are in contact to one another to provide grounding function so as to discharge static electrons. Besides, the original grounding function of the SDIO memory card is not influenced.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
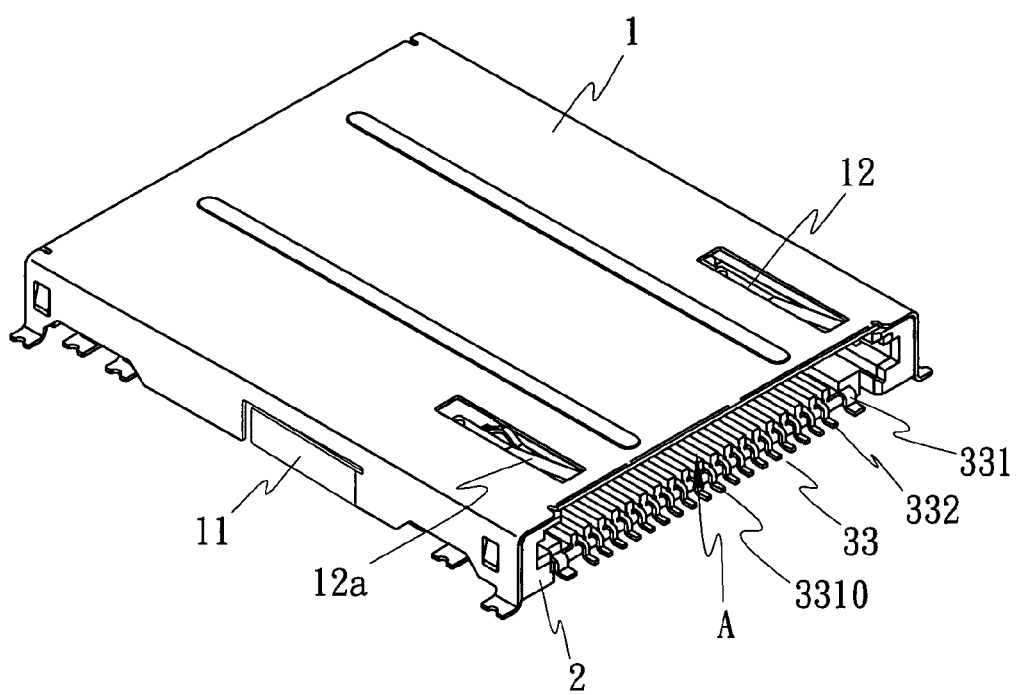
FIG. 1 is an assembled perspective view of the multiple-in-one memory card insertion seat of the present invention.
Figure 2:
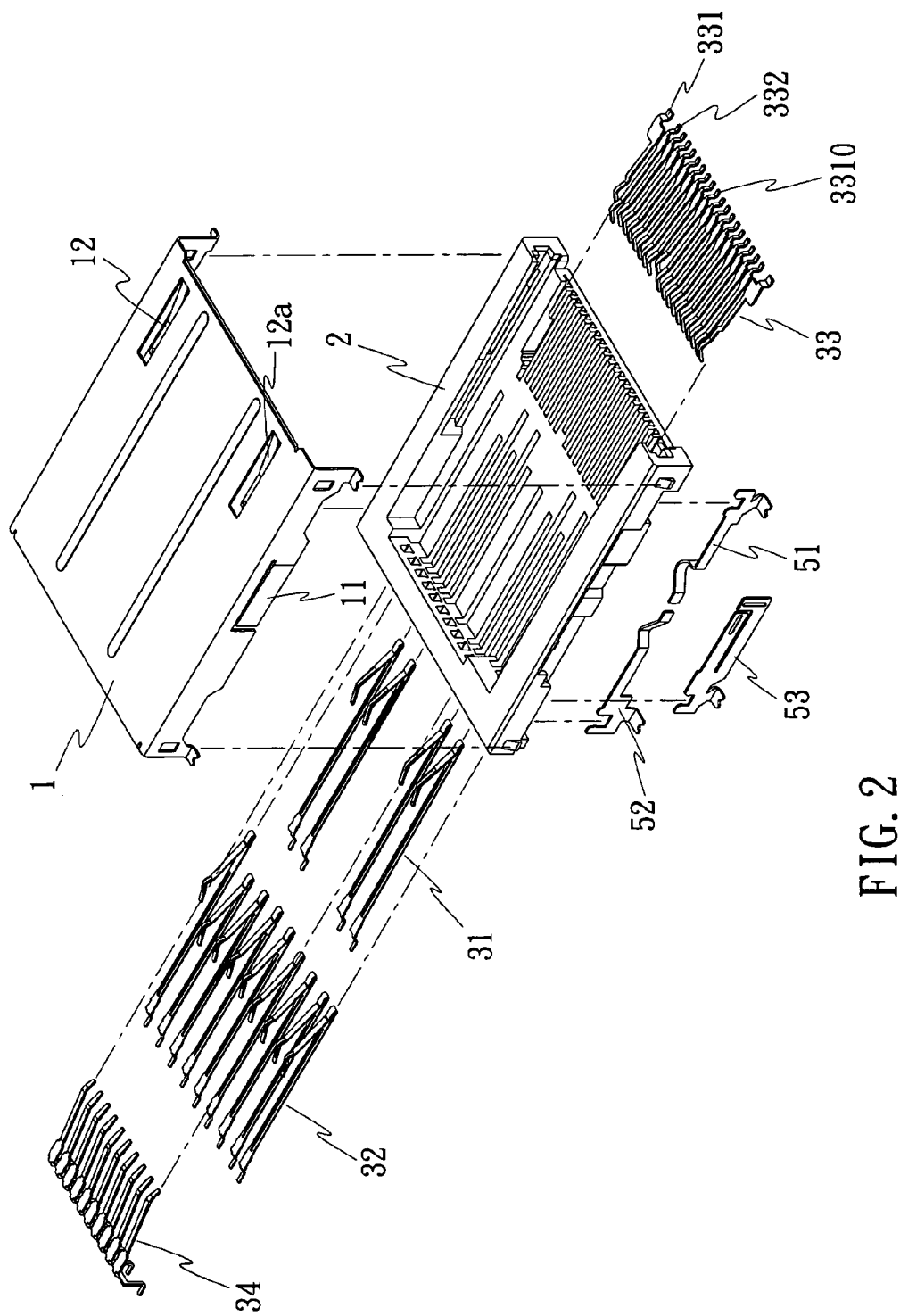
FIG. 2 is an exploded perspective view of the multiple-in-one memory card insertion seat of the present invention.
Figure 3:
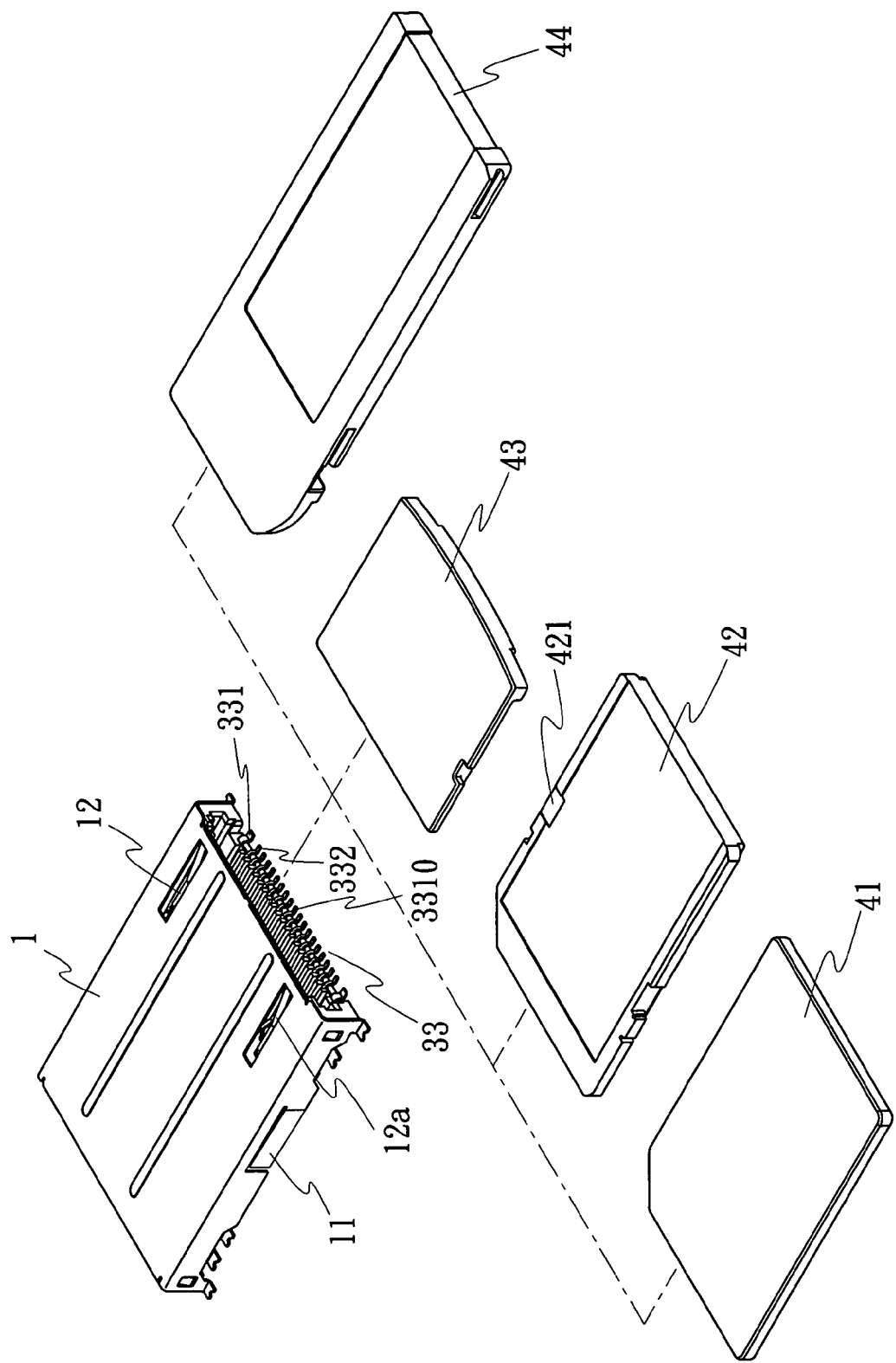
FIG. 3 is a perspective view showing that the multiple-in-one memory card insertion seat is applied in various memory cards.

Referring to FIGS. 1, 2 and 3, a multiple-in-one memory card insertion seat of the present invention comprises: an iron casing 1; a common terminal seat 2; and multi-conductive terminal group 31, 32, 33 and 34 (which are sequentially the MMC4.0 terminal group 31, SD terminal group 32, XD terminal group 33 and MS terminal group 34).

The iron casing 1 is a metal cover. The iron casing 1 is insulated from a grounding point of a PCB so as to remove the grounding function of the iron casing 1.

The common terminal seat 2 is an insulation seat and is correspondingly connected to the iron casing 1. A common slot A is the connected side of the common terminal seat 2 and the iron casing 1. The common slot A is capable of receiving by insertion one of various memory cards, including memory cards 41, 42, 43 and 44 (referring to FIG. 3, in this embodiments they are sequentially the MMC4.0 memory card, SD memory card 41 or SDIO memory card 41, XD memory card 43 and MS memory card 44). The matched slot (referring to FIG. 4) is defined in the common slot A so that an MS memory card is shifted from the side (positioned) with a distance of about 0.3~1.3 mm (referring to the embodiment, the shift is toward a selected direction of the first pin 331 of the XD terminal group 33). Then the first pin 331 (the original is the pin of the GND) of the XD terminal group 33 is unconnected. The grounding function is offered by the tenth pin 3310 of the XD terminal group 33. Thus, removing grounding function of the first pin 331 of the XD terminal group 33 will not influence the original grounding function.

Figure 4:
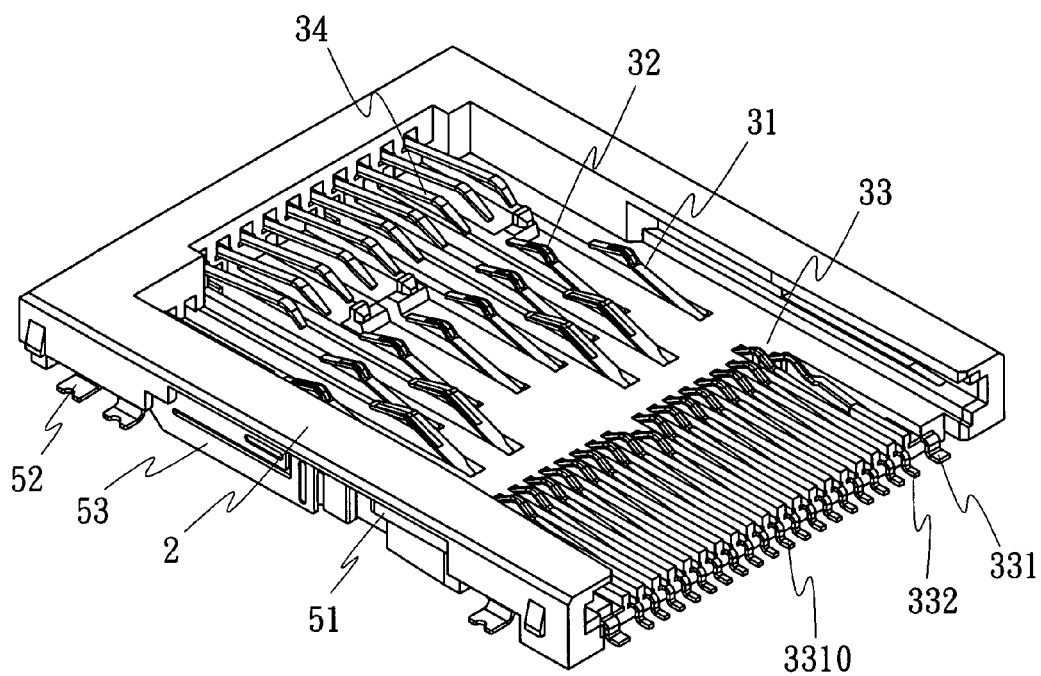
FIG. 4 is a perspective view showing that the iron casing of the present invention is removed.

The multi-conductive terminal group 31, 32, 33 and 34 are installed in the common terminal seat 2 so as to provide the correspondingly conductive connections, referring to FIG. 4. In this embodiment, they include the MMC4.0 terminal group 31, SD terminal group 32, XD terminal group 33 and MS terminal group 34 so as to provide the correspondingly conductive connection for MMC4.0 memory card 41, SD memory card 42, XD memory card 43 and MS memory card 44. The above-mentioned conductive terminal group 31 is not only capable of providing the conductive connection for MMC4.0 memory card 41, but also providing the common conductive connection with the conductive terminal group 32 for SD memory card 42. The above-mentioned conductive terminal groups 31, 32, 33 and 32 are known in the prior art and thus will not be described in detail. However, the distribution or configuration of the conductive terminal groups are capable of changing depending on various use demands of the memory cards.

Figure 5:
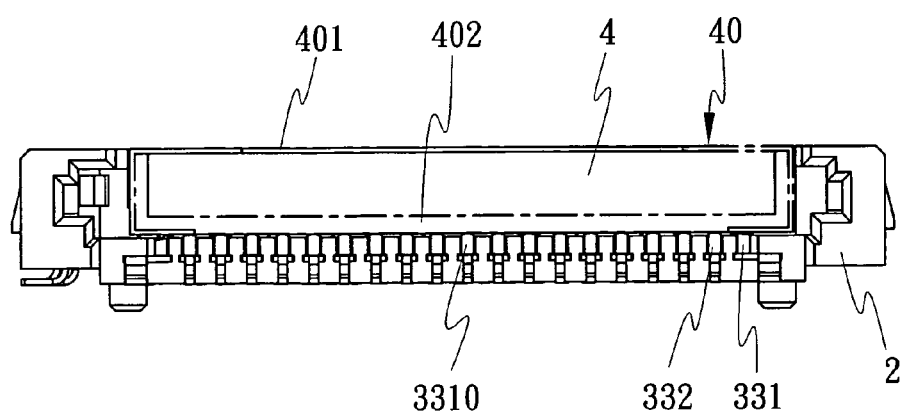
FIG. 5 is a front view showing that the multiple-in-one memory card insertion seat inserts into a simulation MS long card.
Figure 6:
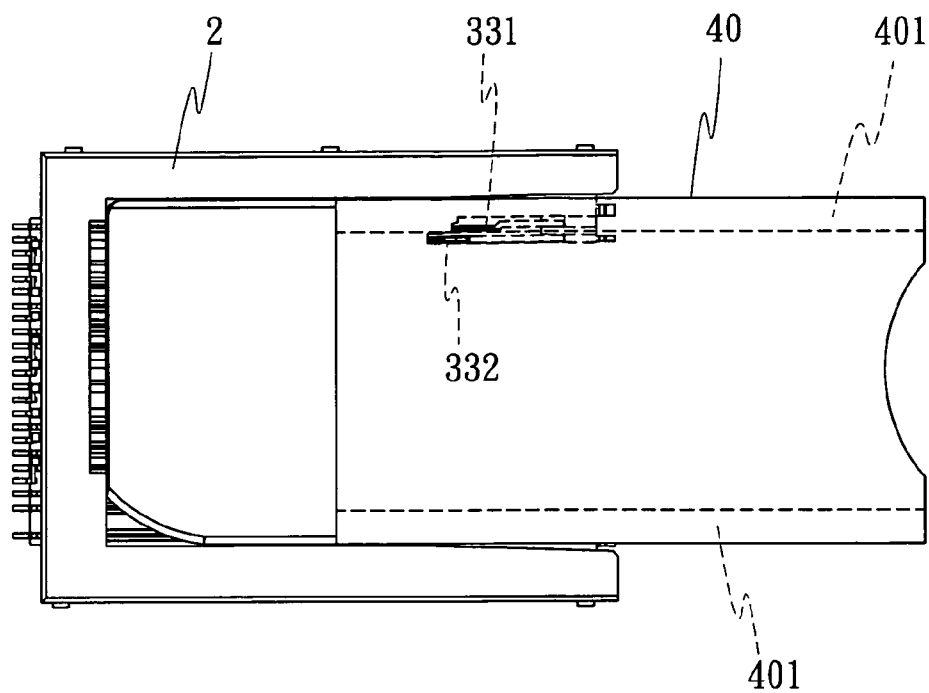
FIG. 6 is an elevation view showing that the multiple-in-one memory card insertion seat inserts into a simulation MS long card.
Figure 7:
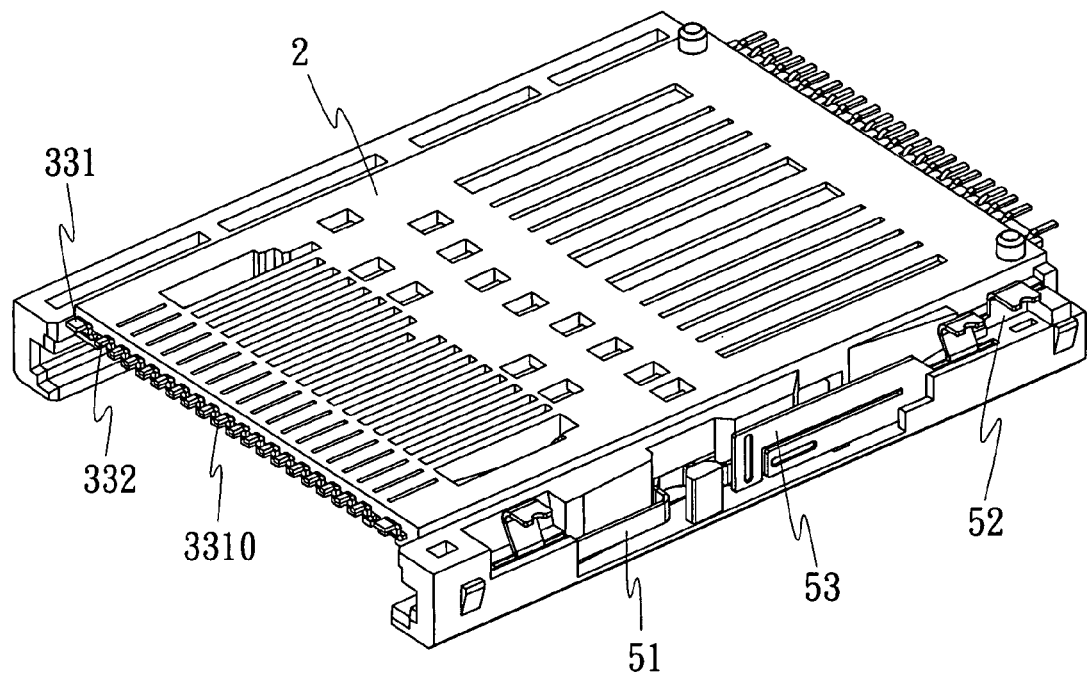
FIG. 7 is a perspective view of the bottom side of the FIG. 4.
Figure 8:
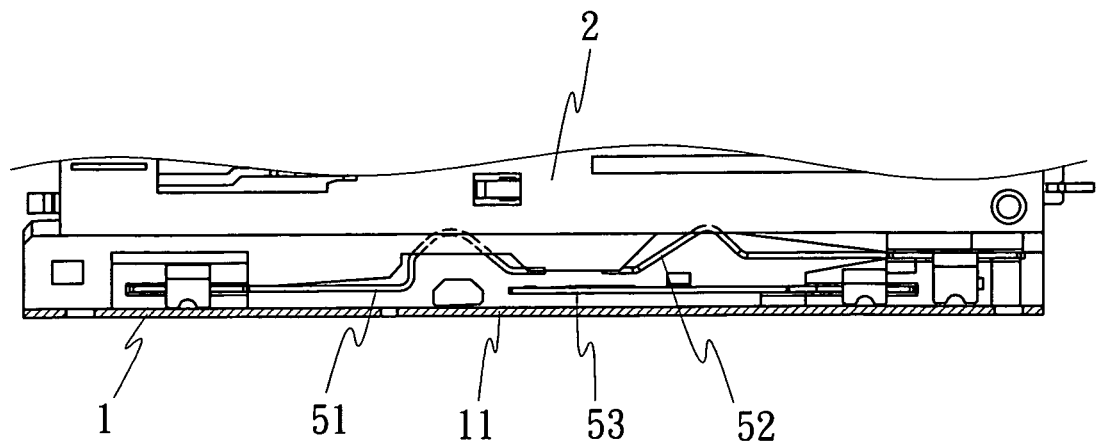
FIG. 8 is a perspective view about the iron casing arm, the read and write proof detecting sheet and the grounding terminal of the present invention.
Figure 9:
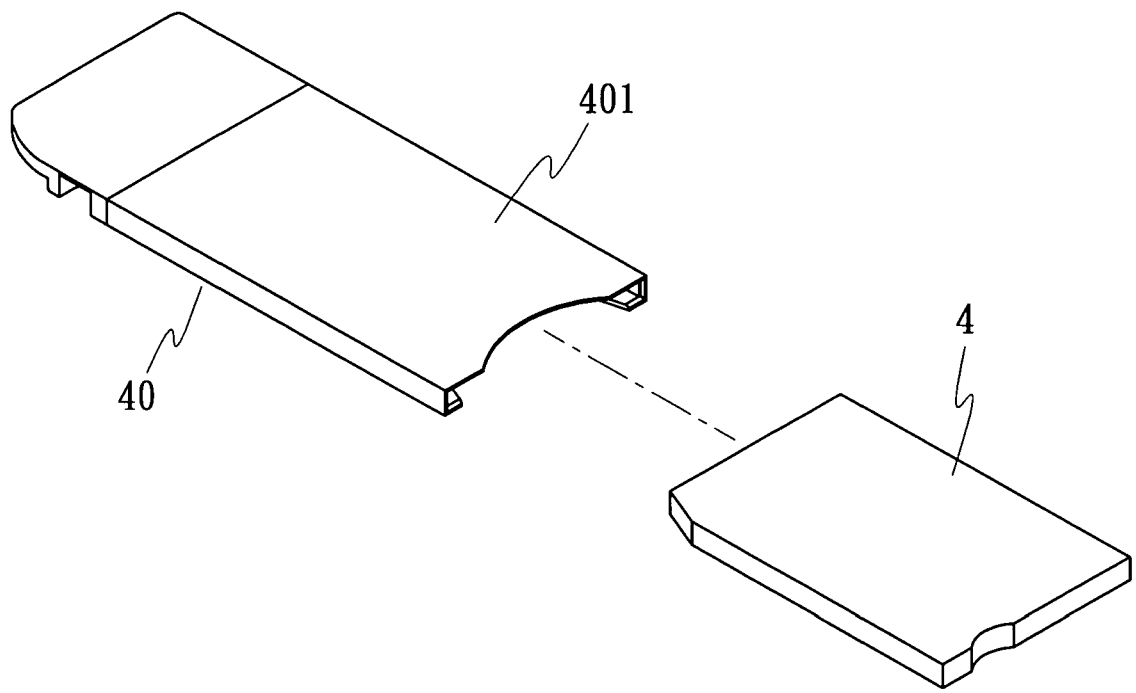
FIG. 9 is an exploded perspective view of a prior art the MS Duo (or MS Pro Duo) memory card and the adaptor card.
Figure 10:
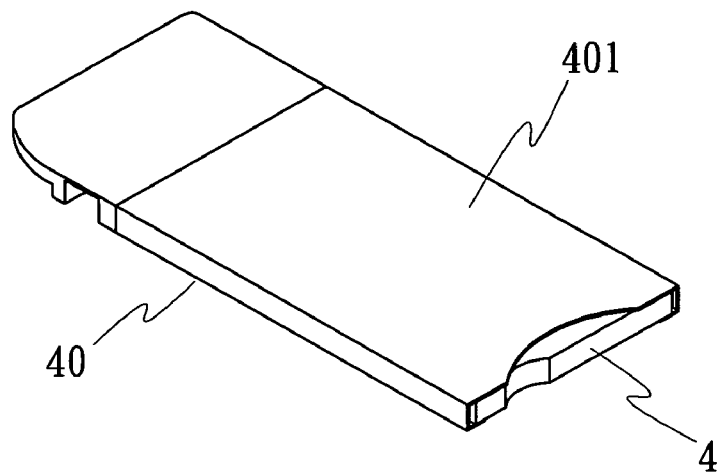
FIG. 10 is an assembled perspective view showing that a prior art MS Duo (or MS Pro Duo) memory card inserts into the adaptor card stimulating a MS long card style.
Figure 11:
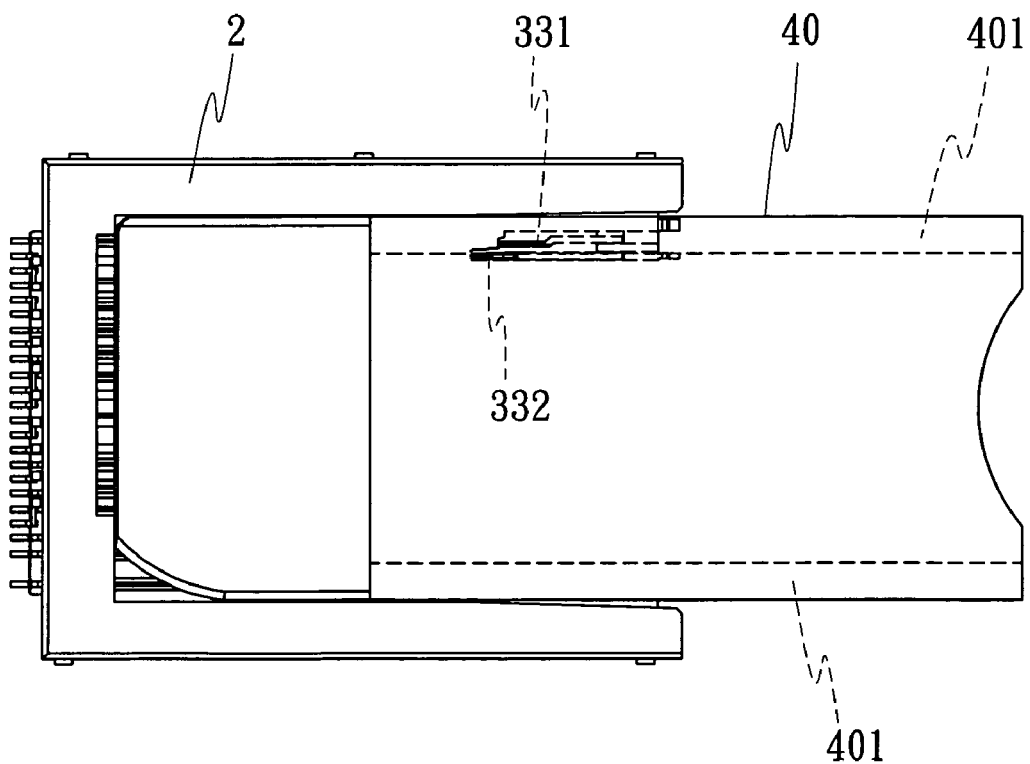
FIG. 11 is a perspective view showing that a prior art simulating MS long card is inserted into the memory card insertion seat.

According to the above-mentioned multiple-in-one memory card insertion seat, the shift of the middle portion of the matched slot of the MS memory card is aimed at improving the defects of installation of the short memory card 4 of the MS Duo or MS Pro Duo and the adapter card 40. The matched slot of the MS memory card has already been shifted and the grounding function of the first pin 331 of the XD terminal group 33 of the XD memory card has been removed. Therefore, even if the outer metal layer 401 of the adaptor card 40 is exposed, the adaptor card 40 will not conduct due to accidental contacts with the first pin 331 and the second pin 332 of the XD memory card (referring to FIG. 5 and FIG. 6). Thus, when the MS Duo or MS Pro Duo short memory card 4 is installed in the adaptor card 40, the pins of insertion seat will not influence the normal function of the memory cards for reading data.

Above-mentioned shift distance of the matched slot of MS memory card must shift at least one pin distance so as to prevent the outer metal layer 44 of the adaptor card 40 from contacting the second pin 331 (e.g. CD pin) when the MS Duo or MS Pro Duo short memory card 4 is installed in the adaptor card 40. Because of the evaluation of the original wall thickness and strength of the wall thickness, the appropriate shift distance ranges in 0.3~1.3 mm and the 0.3 shift distance is a preferred embodiment.

The present invention is the multiple-in-one memory card insertion seat. Because the grounding function of iron casing 1 has been removed, the grounding function of the SDIO memory card 42 (e.g. the SD memory card with the input-output functions of Bluetooth or wireless network) must be provided. Furthermore, the iron casing 1 has iron-casing arms 11 (referring to FIG. 2). The surface of the iron casing 1 is punched to have an elastic sheet 12, 12a. Only the punched elastic sheet 12 on the one side of the iron casing 1 is capable of pressing against the electric static terminal 421 of the SDIO memory card 42 (the punched elastic sheet 12a on the other side of the iron casing 1 has not such a function). The function of electro static discharge is performed by passing through a contact detection sheet 52 to a grounding terminal 53 by use of pressing against a contact thereof for providing grounding function. The original grounding function of the SDIO memory card is not affected. In other words, when the SDIO memory card 42 is inserted into the common slot A, the punched elastic sheet 12 presses against the electric static terminal 421 of the SDIO memory card 42 (referring to FIG. 3) The SDIO memory card 42 presses against and contacts the grounding terminal 53 and iron-casing arm 11. Therefore, the iron-casing arm 11, contact detection sheet 52 (a prior read and write proof detecting sheet 51 on the opposite side) and grounding terminal 53 are in contact to each other so as to provide grounding function to discharge static electrons.

In summary, the multiple-in-one memory card insertion seat of the present invention is novel and inventive. After the MS Duo or MS Pro Duo short memory card is connected to the adaptor card 40, the multiple-in-one memory card insertion seat still functions well to free from conduction due to mistake contacts or crash. The multiple-in-one memory card insertion seat is obvious improved for applying function.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multiple-in-one memory card insertion seat comprising:

a common terminal seat;

a metal cover disposed on a connected side of the common terminal seat, the metal cover being insulated from a grounding point of a PCB to remove a grounding function of the metal cover;

a common insertion slot defined between said common terminal seat and said metal cover;

a matched slot defined in the common insertion slot, the matched slot being configured for insertion of an MS memory card;

a plurality of multi-conductive terminal groups disposed in the common terminal seat, the plurality of multi-conductive terminal groups including an MMC4.0 terminal group, an SD terminal group, an XD terminal group, and an MS terminal group to provide conductive connections corresponding to various memory cards;

wherein a first pin of said XD terminal group has no electrical connection; and wherein said matched slot is shifted toward a side of said common insertion slot toward said first pin such that when an MS Duo short card or MS Pro Duo short card is inserted along with an adapter card into the matched slot an outer metal layer of the adapter card is prevented from contacting both first and second terminals of the XD terminal group;

whereby circuit damage caused by an accidental short circuit between the first and second terminals of the XD terminal group or by accidentally grounding the nineteenth or twentieth terminals of the XD terminal group through the outer metal layer of the adapter card and the first pin of the XD terminal group is avoided.

2. The multiple-in-one memory card insertion seat according to claim 1, wherein said matched slot is shifted by about 0.3 to about 1.3 mm.

3. The multiple-in-one memory card insertion seat according to claim 1, wherein the grounding function of said metal cover is enabled by pressing a contact detection sheet against a grounding terminal.

* * * * *